May 14, 1940.  G. H. C. CORNER  2,201,122
SEPARABLE FASTENER
Original Filed Nov. 23, 1935
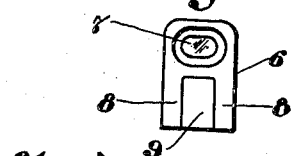
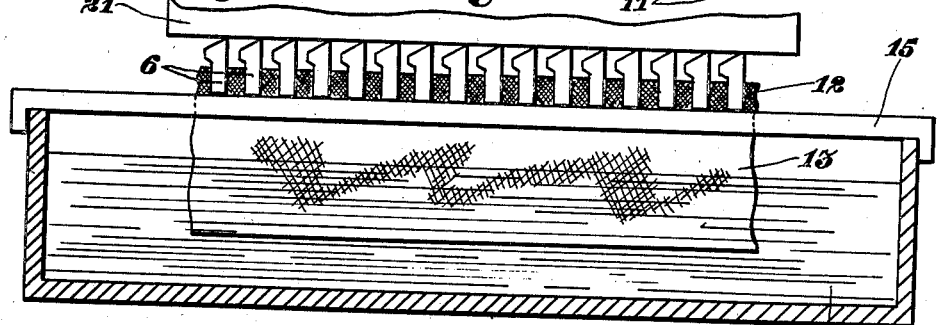
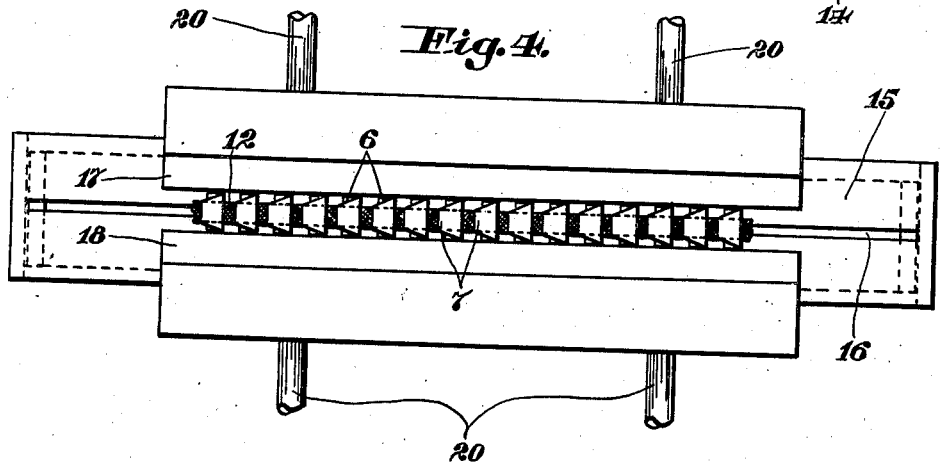
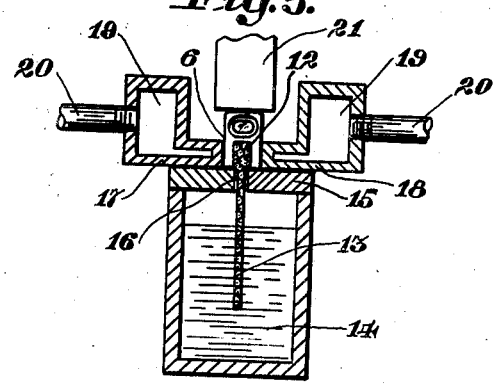
INVENTOR.
George H. C. Corner.
BY Kelley + Chisholm
ATTORNEYS.

Patented May 14, 1940

2,201,122

UNITED STATES PATENT OFFICE 2,201,122

SEPARABLE FASTENER

George Henry Clifford Corner, Birmingham, England, assignor to Talon, Inc., a corporation of Pennsylvania Application November 23, 1935, Serial No. 51,302. Renewed October 18, 1939. In Great Britain November 30, 1934

5 Claims. (Cl. 18—59)

This invention relates to the manufacture of separable fasteners of the type in which two flexible stringers provided with fastener members are adapted to be connected and disconnected by means of a slider cooperating with the said fastener members.

The present invention has for its object the provision of an improved method of manufacture whereby the holding power of the fastener members on the mounting tape is increased.

Another object of the invention is to provide an improved method of attaching non-metallic fastener elements to the mounting tape in which the bulk of the fastener member may consist of an insoluble plastic such as a suitable synthetic resin.

This invention is an improvement upon my prior Patent No. 1,920,138, granted July 25, 1933.

In that patent there is disclosed and claimed a method of sticking non-metallic fastener elements to a tape.

The object of the present improvement is to provide a method whereby the sticking material may be forced more thoroughly into the interstices of the fabric tape to create a strong tenacious bond between the fastener member and tape. In this manner the strength and uniformity of holding power of the fastener will undoubtedly be increased.

In one convenient method of carrying my invention into effect I produce, from a non-metallic material such as an artificial resin, U-shaped fastener members having two jaws and an interlocking head portion. We refer to the fastener member as a completed article as shown in Fig. 2 ready for attachment to the tape. The principal part sometimes herein termed the "body" of the fastener member includes the interlocking head and the jaws except for the lining element 11. This is referred to as the tape contacting portion. The inside of the jaws of the said members is coated with a soluble plastic material such as Celluloid and this is preferably carried out by initially making the gap between the jaws of the members of greater width than the thickness of the edge of the tape and then completely filling in this gap with Celluloid. The mid-section of the Celluloid is then removed by a cutting operation to form a gap having substantially the same width as the edge of the mounting tape. In a subsequent operation the fastener members are placed in accurate spaced relationship on the edge of the tape and the assembly is then dipped into a bath of suitable solvent such as acetone for a few seconds to soften the Celluloid material. While the Celluloid is still in the softened condition, the fastener stringer is introduced into a press in which suitable pressure is applied to the jaws of the fastener members to urge the inner surfaces of the latter into firm contact with the mounting tape. By this means part of the softened Celluloid is forced into the spaces of the weave of the fabric and the fastener members are thus firmly keyed to the tape.

The press is preferably warmed to a temperature of about 65° C. to accelerate the evaporation of the solvent and to facilitate the slight bending of the jaws of the fastener members.

In the accompanying drawing I have shown for purposes of illustration one embodiment which my invention may assume in practice. In the drawing:

Fig. 1 is a plan view of a fastener element in one stage of the particular method illustrated;

Fig. 2 is a similar view showing the fastener element ready for application to the tape;

Fig. 3 is a vertical sectional view showing schematically a suitable apparatus for carrying out the next step in the operation;

Fig. 4 is a plan view of such apparatus; and

Fig. 5 is a cross-sectional view of the same apparatus.

While fastener elements consisting wholly of soluble non-metallic material, such as pyroxylin may be used if desired, in the illustrated embodiment I have shown fastener elements 6 consisting principally of an insoluble plastic material such as Bakelite or other synthetic resin. This fastener element is formed with an interlocking portion 7 at one end and at the other end bifurcated portions 8. An insert 9 of soluble plastic material is anchored firmly between the bifurcated portions 8 by cement or other suitable means. A slot 10 is next cut in this insert so as to provide tape contacting portions 11 of soluble plastic material.

A series of fastener elements so formed are placed astride the beaded edge 12 of the mounting tape 13. The edge of the tape will fill the slots 10 so that the fastener elements are retained temporarily by friction. The stringer in this form may be dipped in a bath of suitable solvent but preferably it is placed in a suitable fixture over a solvent bath 14. This fixture may comprise a slotted cover plate 15 upon which the fastener members rest when the tape is inserted through the slot 16 into the solvent. The solvent penetrates the tape and by capillary action rises to the beaded edge 12 and will soften the soluble portions 11. On each side of the fastener members there are movably mounted pressure applying bars 17, 18 which are preferably held so as to receive steam in suitable cavities 19 from the steam pipes 20. In this manner the fastener members may be heated during the application of pressure in order to accelerate the evaporation of solvent. It will be evident that the application of pressure particularly when combined with heat, will cause a more thorough penetration of the material into the mounting tapes whereby the fastener members will be more firmly anchored in their positions on the tape.

While I have shown and described in this application one embodiment which my invention may assume in practice, this embodiment is merely for the purposes of illustration and description and various other forms may be devised within the scope of my invention as defined in the appended claims.

What I claim as my invention is:

1. The method of making separable interlocking fasteners of the class described, comprising forming fastener members from insoluble non-metallic material with an interlocking portion at one end and a bifurcated portion at the other end, fixing an insert of soluble non-metallic material between said bifurcated portions, forming a tape receiving slot in said insert, placing a series of said fastener members on the edge of a tape with the edge of the tape filling the slots in said inserts, and then sticking said insert material to said fabric tape by the use of a suitable solvent.

2. The method of making separable interlocking fasteners of the class described which consists of producing from a non-metallic material such as artificial resin, U-shaped fastener members having two jaws and an interlocking head portion, in which the gap between the jaws of the members is of greater width than the thickness of the edge of the tape to which the fastener members are to be attached, filling in this gap with soluble non-metallic material, and removing by a cutting operation, the mid-section of said soluble filling material to form a gap having substantially the same width as the thickness of the edge of the mounting tape, placing such fastener members in the desired spaced relationship on the edge of the tape, and causing the same to adhere to said tape by softening said soluble material with a suitable solvent.

3. The method of making separable interlocking fasteners of the class described which consists of producing from a non-metallic material such as artificial resin, U-shaped fastener members having two jaws and an interlocking head portion, in which the gap between the jaws of the members is of greater width than the thickness of the edge of the tape to which the fastener members are to be attached, filling in this gap with soluble non-metallic material, and removing by a cutting operation, the mid-section of said soluble filling material to form a gap having substantially the same width as the thickness of the edge of the mounting tape, placing such fastener members in the desired spaced relationship on the edge of the tape, causing same to adhere to said tape by softening said soluble material and applying pressure to the jaws of the fastener member so as to force said soluble material more completely into the mounting tape.

4. The method of making separable interlocking fasteners of the class described, which comprises producing fastener members with U-shaped bodies of insoluble material and each having two jaws and an interlocking head portion in which the gap between the jaws is greater in width than the thickness of the edge of the tape to which he members are to be attached and with a U-shaped lining member of soluble material in said gap, and then applying said fastener members in spaced relationship on the edge of the tape and causing said soluble material to adhere to the tape by softening the same.

5. The method of making separable interlocking fasteners of the class described comprising forming fastener members in which a portion thereof including the interlocking parts consists of insoluble material and in which a tape contacting portion consists of soluble material, softening the soluble material of said tape contacting portion with solvent, and pressing the same in contact with said tape to cause the fastener member to stick firmly to the tape.

GEORGE HENRY CLIFFORD CORNER.